United States Patent [19]

Thompson

[11] Patent Number: 5,785,834
[45] Date of Patent: Jul. 28, 1998

[54] ELECTROSTATIC FILTER

[75] Inventor: Donald E. Thompson, Modesto, Calif.

[73] Assignee: Contamco Corporation, Silver Spring, Md.

[21] Appl. No.: 812,045

[22] Filed: Mar. 6, 1997

Related U.S. Application Data

[63] Continuation of Ser. No. 466,513, Jun. 6, 1995, Pat. No. 5,630,926, which is a continuation of Ser. No. 105,065, Aug. 12, 1993, abandoned.

[51] Int. Cl.$^6$ ............................. B01D 35/06; B03C 5/02
[52] U.S. Cl. ..................... 204/562; 204/560; 204/571; 204/572
[58] Field of Search .......................... 204/560, 561, 204/562, 571, 572, 665, 666

[56] References Cited

U.S. PATENT DOCUMENTS

| | | | |
|---|---|---|---|
| 3,252,885 | 5/1966 | Griswold | 204/302 |
| 3,544,441 | 12/1970 | Griswold | 204/186 |
| 3,729,402 | 4/1973 | Griswold | 204/302 |
| 3,852,178 | 12/1974 | Griswold | 204/186 |
| 3,891,528 | 6/1975 | Griswold | 204/186 |
| 4,372,837 | 2/1983 | Watson et al. | 204/186 |
| 4,579,637 | 4/1986 | Jaisinghani et al. | 204/186 |
| 4,594,138 | 6/1986 | Thompson | 204/302 |
| 4,800,011 | 1/1989 | Abbott et al. | 204/302 |
| 4,961,845 | 10/1990 | Dawson et al. | 210/85 |
| 5,352,347 | 10/1994 | Reichert | 204/665 |

*Primary Examiner*—Kathryn L. Gorgos
*Assistant Examiner*—William T. Leader
*Attorney, Agent, or Firm*—Jacobson, Price, Holman & Stern, PLLC

[57] ABSTRACT

An electrostatic filter utilizes two separate filter cartridges in a parallel flow configuration with respect to incoming dielectric fluid containing particulates. Each cartridge is connected to opposite sides of a high voltage power supply, resulting in the electrodes contained in one of the cartridges having an opposite polarity than the electrodes contained in the other cartridge. This, in turn, results in having the fluid borne particulates exiting one cartridge being charged oppositely to those exiting the other. The fluid streams exiting the two cartridges are joined together, allowing the particulates to flocculate. These larger groupings of particulates may then be mechanically filtered in a third cartridge. The parallel flow configuration results in an electrostatic filter that is relatively insensitive to water contained in the dielectric fluid.

2 Claims, 4 Drawing Sheets

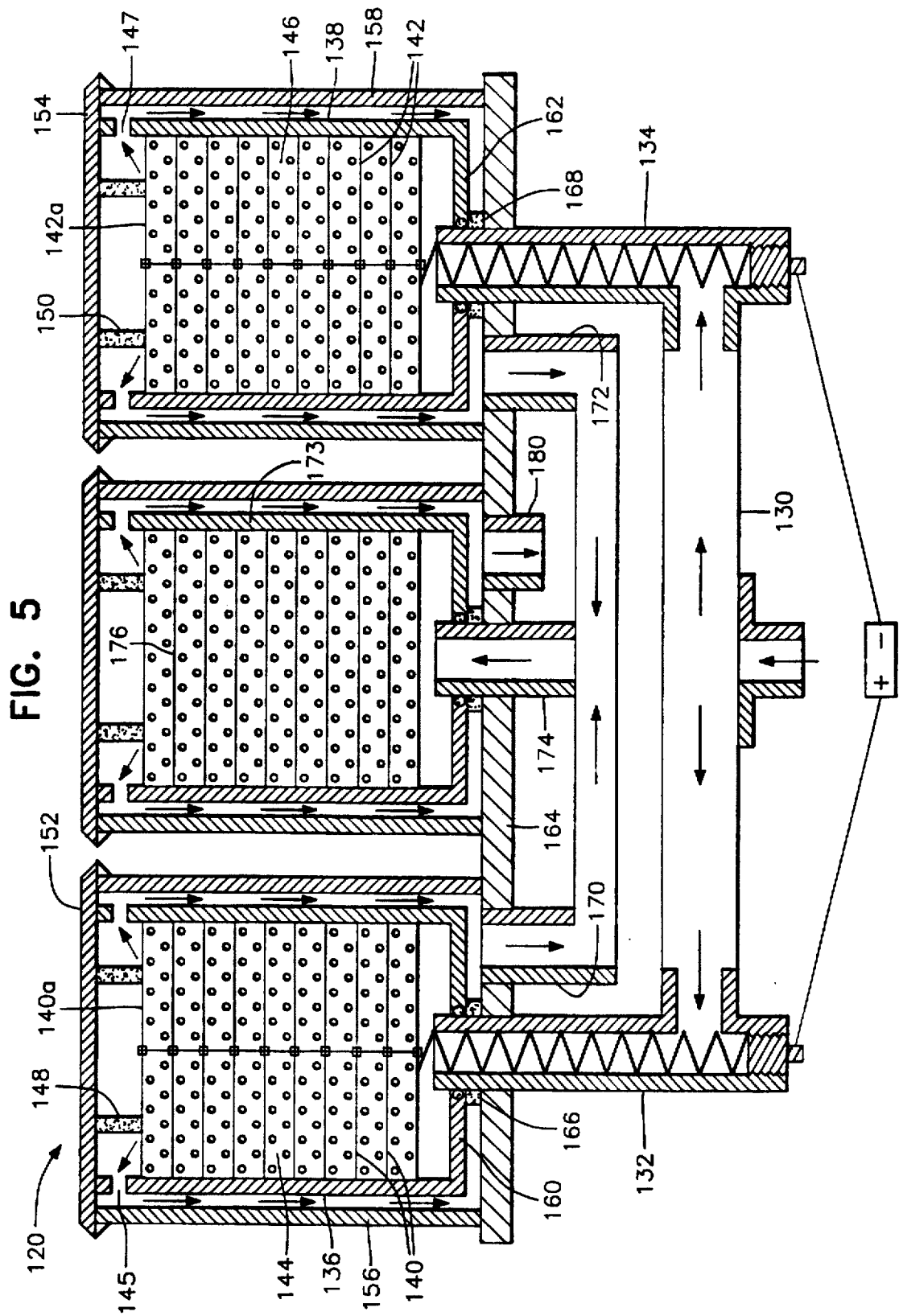

ELECTROSTATIC FILTER

This is a continuation of application Ser. No. 08/466,513, filed Jun. 6, 1995, now U.S. Pat. No. 5,630,926 which is a continuation of application Ser. No. 08/105,065, filed Aug. 12, 1993, abandoned.

TECHNICAL FIELD

The present invention relates to apparatus for filtering particulate matter from fluids and more particularly to filters which are adapted to remove fine particulates, which are capable of being charged, from dielectric fluids.

BACKGROUND ART

The prior art includes filters for removing particulates from various dielectric fluids, such as oils and hydraulic fluids, by employing mechanical filtration. When mechanical filtration is employed to filter very fine particles of, for example, from about 3 to 5 microns, difficulties may be encountered because these relatively small particles require large bulk and volume filters to avoid significant system pressure drops caused by the necessarily small openings in the filter.

Alternatives to mechanical filters for fine particle filtration of dielectric fluids include electrostatic filters where the fluid is made to pass through a number of electrodes which are alternately charged with relatively high positive and negative voltages. Porous filter material is placed between the electrodes for trapping the particulates. It appears that the particulates, when subjected to the electric fields created by the application of voltage to the electrodes, are filtered in one of two possible ways. The filter material itself may be charged with the particulates being attracted to the filter material itself. More likely, however, the particulates are charged, either positively or negatively, depending on their composition, and the oppositely charged particles will be attracted to each other and eventually form a floc of larger particulate clusters which will be large enough to be trapped in the filter material. Whenever enough clusters form to effectively block the filter, or produce an undesirable pressure drop, the filter must be replaced.

While these electrostatic filters have evolved over a number of years, these filters still present a number of problems. Among these problems are the overall costs, difficulties in assembly, and inability to test to determine whether the assembly has been properly accomplished. A very significant problem, moreover, is the debilitating or dysfunctional effect of relatively small amounts of water, or other conductive agents, present in the dielectric fluid. This water or these agents may cause a short circuit between adjacent electrodes. Alternatively, voltage may have to be reduced to an amount below the required voltage for acceptable performance of the electrostatic filter.

SUMMARY OF THE INVENTION

Accordingly, it is an object of this invention to provide an improved electrostatic filter for filtering fluid borne particulates, including the improved filtering of particulates contained in dielectric fluids that further include water or other conducting agents.

It is another object of this invention to provide an improved electrostatic filter which may be easily assembled.

It is a further object of this invention to provide an improved electrostatic filter which may be easily tested for proper assembly.

It is still another object of this invention to provide an improved electrostatic filter whose functional filter elements may be easily replaced.

It is a still further object of this invention to provide an improved electrostatic filter whose functional filter elements may be safely replaced.

It is yet another object of this invention to provide an improved electrostatic filter which may be fabricated with cost savings.

It is a yet further object of this invention to provide an improved electrostatic filter whose functional filter elements may be replaced more quickly than similar prior art filter elements and replaced at less cost.

Briefly, these and other objects may be achieved with a multi-chambered electrostatic filter, each chamber including replaceable functional filter elements contained within a fluid tight housing, at least two of the chambers having both electrode and porous filter material as the functional filter elements with the third chamber having only porous filter material as the functional filter element, each of the chambers being mechanically interconnected in fluid carrying communication.

BRIEF DESCRIPTION OF THE DRAWINGS

FIG. 5 is a cross-sectional view, partially in schematic, of another embodiment of the electrostatic filter according to the invention through a vertical plane that passes through the longitudinal axes of the cylindrical filter cartridges.

DETAILED DESCRIPTION OF THE INVENTION

Figure 1:
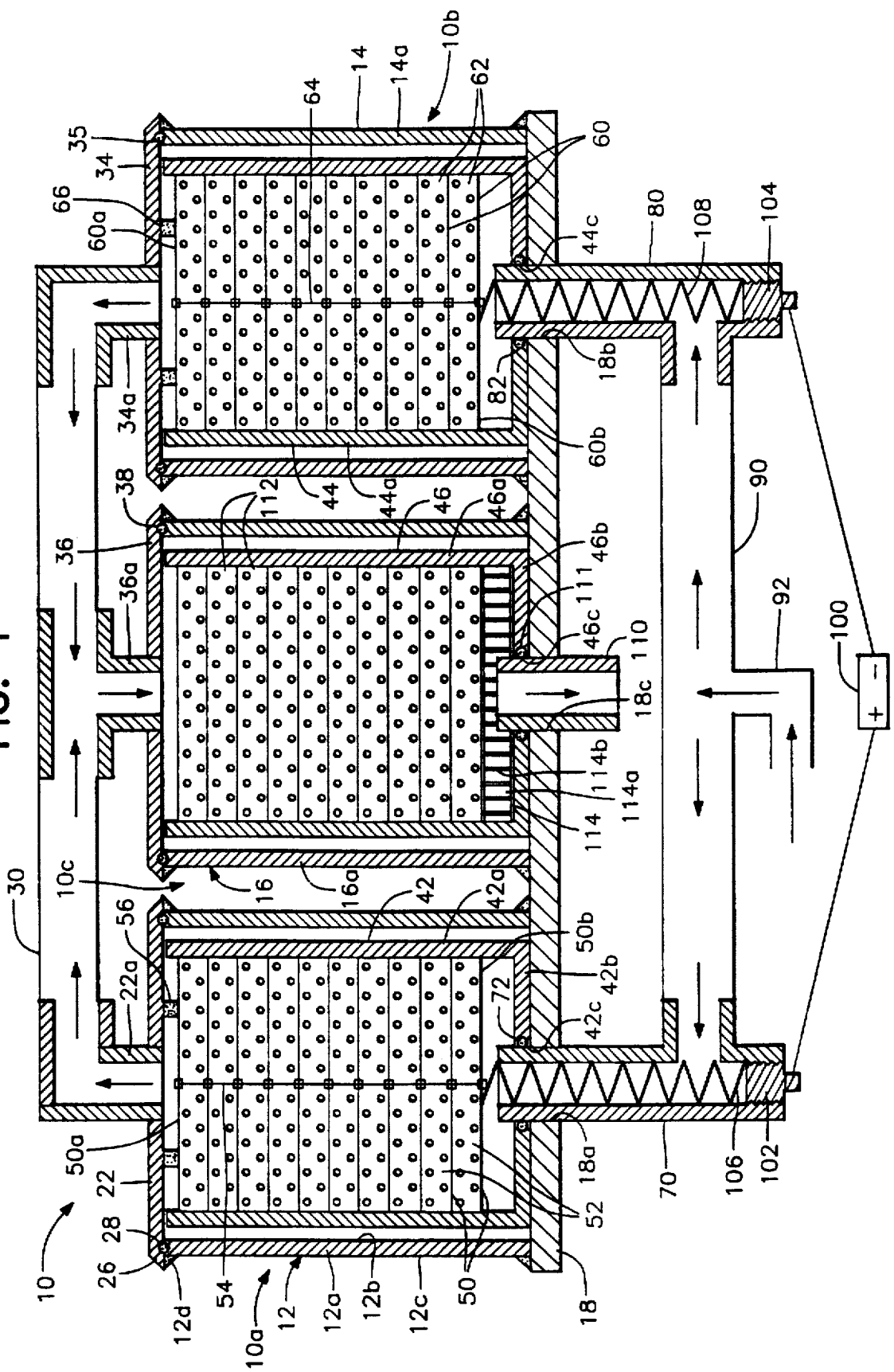
FIG. 1 is a cross-sectional view, partially in schematic, of the electrostatic filter according to the invention through a vertical plane that passes through the longitudinal axes of the cylindrical filter cartridges.

Referring more particularly to the drawings, the electrostatic filter of one embodiment of the present invention is generally indicated by the numeral 10 in FIG. 1 and comprises three sections or chambers 10a, 10b, and 10c. As will be discussed in detail hereinafter, sections 10a and 10b function as charging chambers and contain electrodes and filter material for charging particulate matter in dielectric fluids while section 10c functions as a mixing and collecting chamber containing only filter material for collecting agglomerated particles. As shown therein, electrostatic filter sections 10a, 10b, 10c, include three housings 12, 14, and 16, respectively, each of which is in substantially cylindrical form and is attached to a single base. It should be understood that while the three housings are shown as separate and distinct elements fitted to a single base, these three housings may be combined and constructed or molded as a unitary structure without departing from the scope of the invention. Further, one or more of the housings may be fitted to a separate base without departing from the scope of the invention. Electrostatic filter 10 forms part of a larger pressurized system which pumps fluid into the electrostatic filter. Thus, as will be more fully explained below, the overall integrated electrostatic filter 10 should be fluid tight under existing operational pressures.

Figure 2:
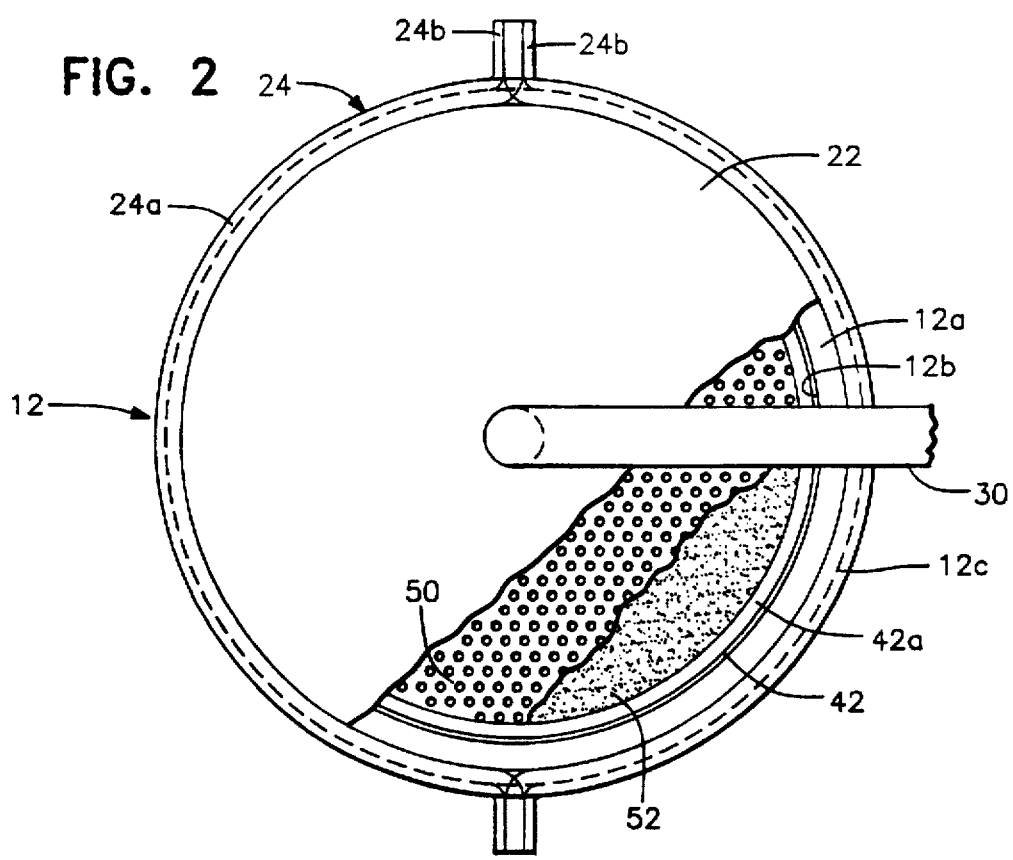
FIG. 2 is a top view of the electrode-containing filter cartridge of the electrostatic filter of FIG. 1 with successive portions of the end cap and interior structure broken away.

Referring now to FIGS. 1 and 2, housing 12 includes open-ended cylindrical side wall 12a having an interior surface 12b and an exterior surface 12c and is fixed in a sealed relationship at its lower end to a base plate 18. The base plate 18 has apertures 18a, 18b, and 18c therethrough which will be more fully described below. A circular end cap 22 is releasably connected to cylindrical sidewall 12a of housing 12 by any convenient quick release and fastening means such as a Marmon clamp shown generally at 24 in FIG. 2 and more clearly illustrated in co-pending patent application Ser. No. 07/717,255. Clamp 24 is designed with a conforming metal band 24a which functions to embrace a curved surface portion 26 of end cap 22 and a curved surface portion 12d of sidewall 12a. As seen more clearly in FIG. 2, band 24a is contracted and expanded through a tightening mechanism, typically a nut and bolt, not illustrated, passing through flanges 24b protruding from band 24a. A fluid tight seal between end cap 22 and side wall 12a is accomplished by an O-ring 28 fitted in a manner known in the art. Returning to FIG. 1, end cap 22 includes an outlet nipple 22a which is formed as part of end cap 22 and threaded, not shown, to provide a fluid-tight coupling to a tubing section 30 to be discussed in greater detail hereinafter.

Similarly, housing 14 includes an open-ended cylindrical side wall 14a fixed to base plate 18 and a circular end cap 34 releasably connected to cylindrical side wall 14a and sealed by O-ring seal 35 in the same manner as discussed above with regard to housing 12. Similar to end cap 22, end cap 34 includes an outlet nipple 34a formed as part of end cap 34 which is externally threaded, not shown, to provide fluid-tight coupling to tubing section 30.

Figure 3:
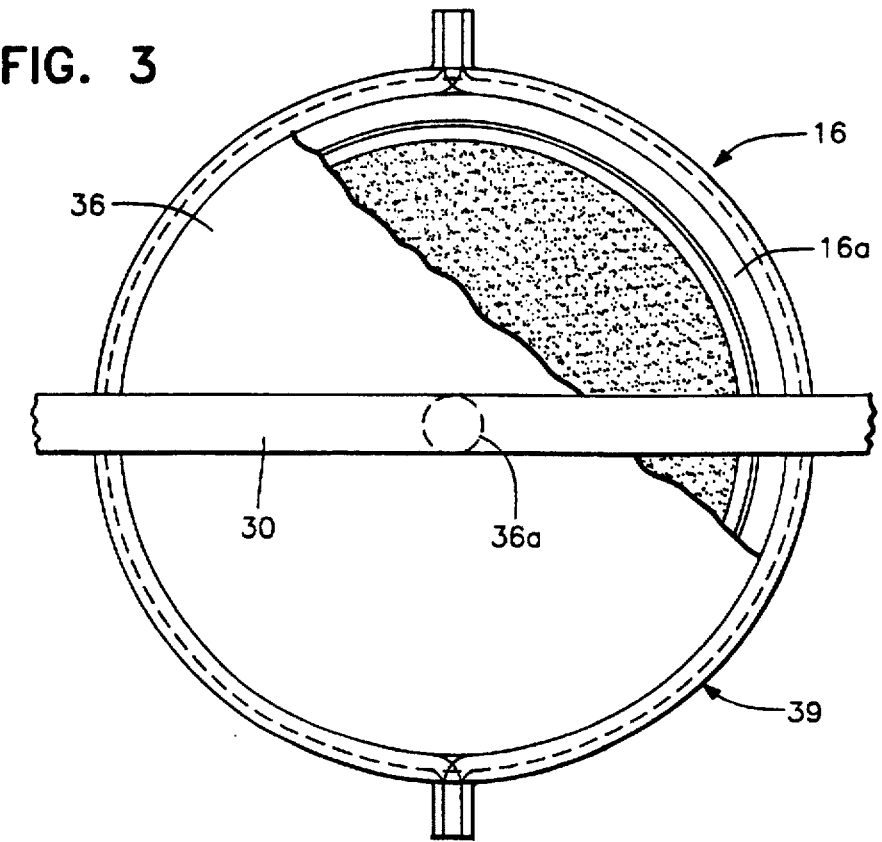
FIG. 3 is a top view of the non-electrode-containing filter cartridge of the electrostatic filter of FIG. 1 with successive portions of the end cap and interior structure broken away.

In similar fashion, housing 16 includes an open-ended cylindrical side wall 16a fixed to base plate 18 and a circular end cap 36 releasably connected to cylindrical side wall 16a and sealed by O-ring seal 38 in the same manner as discussed above with regard to housing 12. As shown in FIG. 3, end cap 36 is releasably connected to cylindrical sidewall 16a by a quick release and fastening means shown generally at 39. End cap 36 includes an inlet nipple 36a formed as part of end cap 36 which is externally threaded, not shown, to provide fluid-tight coupling to tubing section 30. The interconnection between tubing section 30 and nipples 22a, 34a, and 36a is made in a manner known in the art. An equal length of tubing separates inlet nipple 36a from both outlet nipple 22a and outlet nipple 34a.

In the embodiment illustrated in FIG. 1 the three housings 12, 14, and 16 are in alignment with regard to each other and with regard to tubing section 30. It should be understood that it is not essential that the housings be so aligned or aligned with tubing section 30 and that alternative arrangements of these elements are possible without departing from the scope of the invention.

Each of the housings 12, 14, and 16 is of predetermined dimensions and provides an interior volume generally related to a desired fluid processing rate or to the anticipated rate of flow of fluids through the particular fluid system in connection with which the filter is adapted to be used. The housing is preferably made of a non-conductive material, such as a plastic, for reasons related to ease and cost of construction, as well as ease of electrical isolation from the high voltages that must enter the housing, as will be discussed below. Housing 12, 14, and 16 form enclosures for replaceable filter cartridges 42, 44, and 46, with cartridges 42 and 44 being identical in structure, as opposed to the structure of cartridge 46. Inasmuch as filter cartridges 42 and 44 are the same, only filter cartridge 42 will be described in detail.

Filter cartridge 42 is sized to substantially fill housing 12 but is slightly smaller in both length and diameter than the interior of the housing so that the cartridge may be easily inserted and withdrawn from the interior of the housing. Cartridge 42 is formed of a cylindrical shell 42a opened at the top and closed at the bottom by a base 42b. Base 42b has an opening 42c therethrough which is in registration with aperture 18a in base 18 when cartridge 42 is positioned in housing 12. The height of the sidewall of cylindrical shell 42a is substantially the same as that of cylindrical sidewall 12b of housing 12 thereby permitting engagement with the undersurface of end cap 22 when end cap 22 is clamped into position. It should be understood, however, that since housing 12 is made fluid tight by reason of O-ring seal 28, the height of cylindrical shell 42a may be less than that of sidewall 12b without affecting the operation of the electrostatic filter.

Cartridge 42 includes alternatively stacked disc-shaped electrodes 50 and open-cell foam filter elements 52 whose diameters are substantially that of the inside diameter of cylindrical shell 42a, such arrangement being, in general, conventional in the electrostatic filtration art where stacked electrodes are alternately charged positively and negatively. Electrodes 50 and filter elements 52 are shown as being stacked on rod 54, the electrodes having a centrally-located opening 51 through which rod 54 passes. Electrodes 50 may be mechanically and conductively attached to rod 54 by any suitable means, the particular means being dependent on the conductive materials employed by the electrode and rod.

In order to keep the uppermost electrode indicated at 50a from blocking or restricting the flow of fluid through outlet nipple 22a and to maintain a pooling area between electrode 50a and the inside surface of end cap 22, a series of spacers 56 are interposed between electrode 50a and end cap 22. These spacers may be of plastic material and fastened to, or molded as part of, the inside surface of end cap 22. They are constructed of sufficient size to ensure adequate spacing between the electrode and the end cap.

A lower electrode shown at 50b, also attached to rod 54, is electrically connected to a source of high voltage as discussed below.

Filter cartridge 42 and open-cell foam filter elements 52 function to provide both the filtering material to trap the filtered particulates as well as providing the required spacing for the electrodes in the electrode containing cartridges. Preferably, the filter pads are constructed of reticulated foam or similar material having communicating pore or open cell structure. Almost any porous material can be used as long as it is not electrically conductive, it will not physically or chemically degrade in the presence of the fluids being filtered, and its pore size is small enough to trap the fluid-borne particulates yet large enough, like the electrode perforations, discussed hereinafter, to be compatible with the required operational pressures and the filtered fluid flow rates.

As indicated previously, the details of the filter cartridge 44 and its relationship with housing 14 are the same as that of filter cartridge 42 and housing 12. The cartridge 44 includes a cylindrical shell 44a and a base 44b with an opening 44c through the base. Disc-shaped electrodes 60 and foam filter elements 62 are stacked within the cartridge 44, with the electrodes electrically and physically connected to a rod 64. Spacers 66 are positioned between the uppermost electrode 60a and the end cap 34 in order to keep upper electrode 60a from blocking or restricting the flow of fluid through outlet nipple 34a and to maintain a pooling area between electrode 60a and the inside surface of end cap 34. A lower electrode shown at 60b, also attached to rod 64, is electrically connected to a source of high voltage as discussed below.

While in FIG. 1 the spaces between cylindrical sidewalls 42a, 44a, 46a and the interior walls of housings 12, 14, 16 have been exaggerated for purposes of illustration, it should be understood that the spacing between these elements in practice is reduced, but to a degree which nevertheless allows easy insertion and removal of the cartridges 42, 44, 46. Because the housings are made fluid tight by the end cap seals 28, 35, 38, fluid passing over the uppermost end of the cylindrical sidewalls and into the spaces between the cartridges and the housings is nevertheless retained within the system and does not leak therefrom.

Referring more particularly to FIG. 1, an inlet pipe 70 in fixed relationship to base plate 18 extends through aperture 18a into the area bounded by side wall 12a of housing 12. Cartridge 42, when inserted into housing 12, has its base 42b penetrated by the upper end of inlet pipe 70 as the cartridge is positioned in the housing. When pipe 70 passes through opening 42c a fluid tight seal is made between pipe 70 and base 42b by reason of an O-ring seal 72 attached to the base in a manner known in the art. Similarly, inlet pipe 80 extends through aperture 18b in base plate 18 and into housing 14. When cartridge 44 is inserted into the housing the upper end of pipe 80 passes through the opening 44c with O-ring seal 82 providing a fluid tight seal between the pipe and the base of the cartridge.

Inlet pipes 70 and 80 each have fluid interconnection with a lower tubing section 90 which receives, through inlet 92, the contaminated fluid from a source, not shown, of fluid to be cleaned by electrostatic filter 10. It should be understood that while a particular mode of supplying the contaminated fluid to the filter cartridges are illustrated, variations in design may be employed without departing from the scope of the invention.

High voltage from a conventional high voltage power supply depicted schematically at 100, with an output in the range of from about 5,000 to 50,000 volts, is furnished to filter cartridges 42, 44, one side of the power supply to each, i.e., one "positive" and one "negative," by and through high voltage contacts 102,104. A spring loaded conductor 106 is positioned between high voltage contact 102 and bottom electrode 50b of cartridge 42 to provide good electrical contact to the bottom electrode. Similarly, spring loaded conductor 108 provides good electrical contact between high voltage contact 104 and bottom electrode 60b of cartridge 44.

Referring now to FIGS. 1 and 3, removable filter cartridge 46 positioned in housing 16, similar to previously described cartridges 42, 44, is sized to substantially fill housing 46 and to be easily inserted and removed therefrom. Cartridge 46 is formed of a cylindrical side wall 46a opened at the top and closed at the bottom by base 46b. Base 46b has an opening 46c therethrough which is in registration with aperture 18c in base 18 when cartridge 46 is positioned in housing 16. Affixed to base 18 and extending through opening 18c is an outlet pipe 110, the upper end of which enters the area bounded by side wall 46a of cartridge 46 when the cartridge is inserted into housing 46. When pipe 110 passes through opening 46c a fluid tight seal is made between pipe 110 and base 46b by an O-ring seal 111 formed as part of base 46b.

Cartridge 46 includes open-cell foam filter elements 112 whose diameters are substantially that of the inside diameter of cylindrical shell 46a. While filter elements 112 are illustrated as being a series of stacked elements, it should be understood that fewer elements thicker in size, or a single large element filling cartridge 46, could be employed without departing from the scope of the invention.

In order to keep the filter material from blocking or restricting the flow through the outlet pipe 110, a single molded plastic stand-off disc 114 of honeycomb or similar open cross-section having spaces 114a separated by ribs 114b is positioned on base 46b of cartridge 46, the spaces 114a of disc 114 being relatively large to permit easy fluid flow therethrough.

Cartridge 42 is assembled by pre-assembling electrodes 50 and filter media 52 and inserting this pre-assembled unit within the confines of cylindrical side walls 42a. The assembled cartridge 42 is then inserted within housing 12 with the uppermost end of pipe 70 penetrating base 42b and forming a seal therewith. When cartridge 42 is thus positioned spring 106 is compressed by bottom electrode 50b and thereby an effective electrical contact is made between the high voltage source and the electrode. End cap 22 is then positioned on housing sidewall 12a and clamped into a fixed and sealed position by clamping mechanism 24. Tubing 30 is then connected to outlet nipple 22a of end cap 22 to provide a flow path for the charged fluid to exit housing 12. Cartridge 44 is similarly assembled and inserted in its housing.

Cartridge 46 is assembled by placing stand-off disc 114 against base 46b of cartridge 46 and then packing successive layers of filter media 112 within the confines of cylindrical side walls 46a, with the first layer against disc 114. The assembled cartridge 46 is then inserted within housing 16 with the uppermost end of outlet pipe 110 penetrating base 46b and forming a seal therewith. End cap 36 is fastened by clamping mechanism 39 to the housing side wall 16a in a sealed relationship and inlet nipple 36a of end cap 36 is connected to tubing section 30 to provide a flow path for the charged fluid to enter housing 16.

Figure 4:
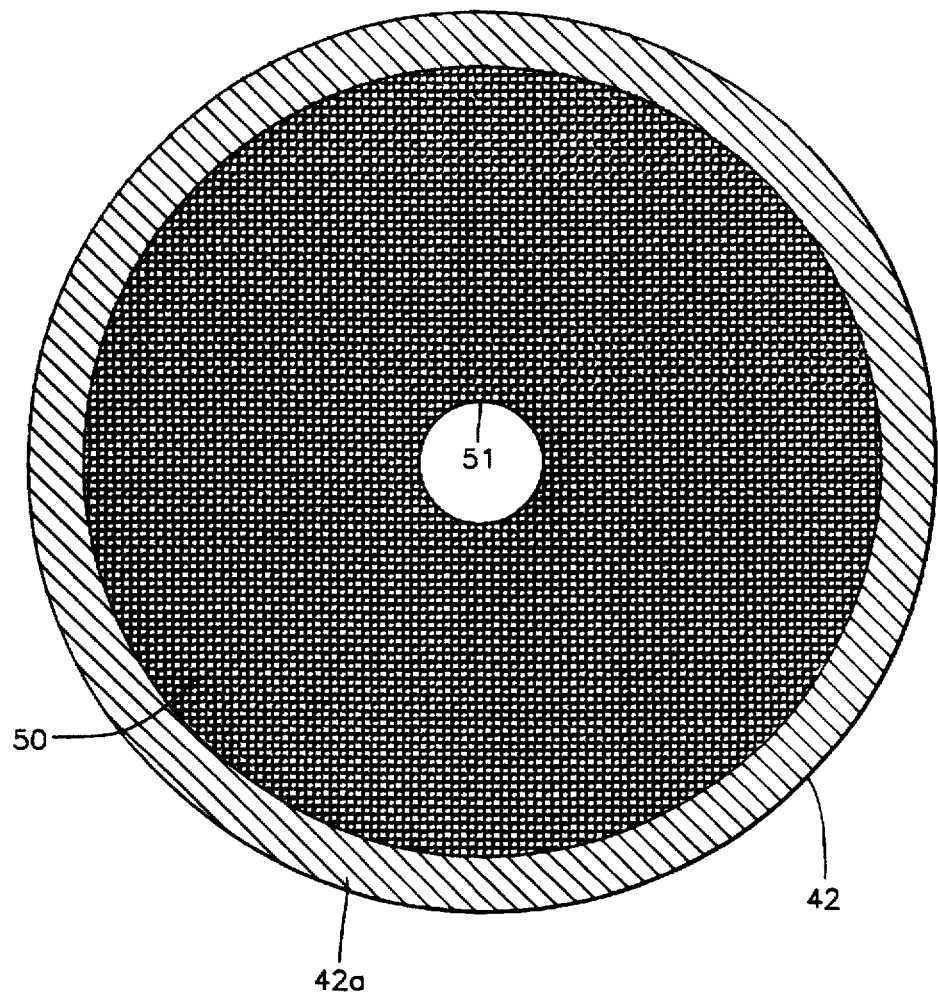
FIG. 4 is a planar view of the metal electrode employed in the electrostatic filter of FIG. 1, the view being transverse to the longitudinal axis of an electrode-containing filter cartridge.

FIG. 4 depicts a disc-shaped electrode 50, in planar view, as it appears within filter cartridge 42. Similar electrodes are positioned throughout cartridge 42 and filter cartridge 44. The diameter of electrode should be only slightly less than the diameter of cylindrical shell 42a so that it fills the interior of the shell. A multiplicity of perforations are formed in the electrode through which the fluid flows and a large opening 51 is formed centrally to allow for insertion of conductive rod 54 in those circumstances where the dimension of the perforation are too small to receive the rod. Reinforcement may be provided around opening 51 to provide any necessary support for the connection between electrode 50 and rod 54. The electrode may be formed of construction screen having a 1/16 to 1/8 mesh size. The selection of mesh size is dependent on the viscosity of the fluid. The thickness and rigidity of the electrode is dependent on the fluid pressure because substantial flexing is not desired.

The construction of the cartridges, including the number of electrodes and filter elements, and the dimensions of the filter housings, can be widely varied according to the particular filter application. One possible cartridge design could have 10 or 20 electrodes sandwiched about reticulated 1.58 cm. foam filter elements with about 80 pores per square inch of surface area. One possible material is polyurethane. This could prove effective in filtering particles with diameters from about 0.5 to 10 microns. It should be noted that the filter elements of cartridge 46 could be formed of the same or different material as that in cartridges 42 and 44, or of a less costly material, such as paper, for example.

Further design variations could have filter elements with different porosity, e.g., from about 20 to 100 pores, or higher, or elements with various porosities within the same filter. The filter element pore design employed would generally be dictated by the anticipated contamination, fluid pressure of the system, and the range of diameters of the particulate matter to be filtered. For instance, the filter elements from the inlet to the outlet of any particular cartridge may progressively decrease in porosity, and, in this way, mechanical filtration may be maximized in relation to a minimal drop in the system fluid pressure. It should also be recognized that filtration processing rates and pressure drops can be varied by placing overall electrostatic filters of a given design in series and/or parallel.

In operation, fluid is pumped through lower tubing section 90 by first entering fluid inlet 92 from a fluid delivery line connected to the source of fluid to be cleaned. The fluid moves through inlet pipes 70, 80 into cartridges 42, 44 where it flows generally axially through the cartridges and substantially contacts the electrodes 50, 60 and filter elements 52, 62. As the volume of the fluid entering the cartridges 42, 44 increases, the fluid will pass through these cartridges into upper tubing section 30 along a flow path from outlet nipples 22a, 34a respectively, the flow paths thereafter joining prior to the entry of the charged fluid through inlet nipple 36a of housing 16. It is at inlet nipple 36a that the fluid flow changes direction and the positively charged particles from cartridge 42 and the negatively charged particles from cartridge 44 meet and begin an agglomeration process. The fluid then continues through cartridge 46 where the particles, formed in flocs, are bulk filtered. Under normal operating conditions, filter cartridge 46, of simpler and less costly construction, is the cartridge that is most often replaced.

Flocculating may be explained as follows. When first entering cartridges 42, 44, particulate matter borne by the fluid, constituting a contaminant, will contact or be carried in close proximity to the various electrodes 50, 60 contained in filter cartridges 42, 44. When doing so, the particulates will take on the charge, positive or negative, of the electrodes. Depending on the connection to the high voltage power supply, all the electrodes in cartridge 42 will be of one polarity, positive or negative (shown to be positive in FIG. 1) and all of the electrodes in cartridge 44 will be the other polarity (here shown negative). The particles in the incoming fluid passing through cartridges 42, 44 may be large enough to be trapped in the filter elements 52, 62 contained in those cartridges. In any event, the particles exiting these respective cartridges into upper tubing section 30 will have different charges, causing the particles to flocculate, thus forming sufficiently large particles where mechanical filtering is effective. The separation of cartridges 42, 44, with the resulting separation of particles with differing charges as they exit these cartridges, has resulted in making the filter largely insensitive to fluids containing even large quantities of water. The water content in these fluids has historically resulted in the breakdown or non-performance of electrostatic filters because the water in these fluids acted as a conductor and caused a short circuit between differently charged adjacent electrodes.

Electrostatic filter 10 generally may be employed to filter any conventional dielectric fluid and may be particularly useful for filtering hydraulic and lubricating fluids. The filter may be used as part of a system that removes particulates from a separately stored volume of used fluid or, alternatively, may be employed as part of operating equipment to remove the particulates as they occur in that equipment.

FIG. 5 shows a cross-sectional view, partially in schematic, of a three-section electrostatic filter 120 in an embodiment wherein all plumbing and electrical equipment are confined below the structure thereby facilitating enclosure of such plumbing and electrical equipment and wherein removal and reinstallation of the end caps are facilitated inasmuch as there is no plumbing connected thereto.

In this embodiment, fluid is pumped through lower tubing section 130 into inlet pipes 132, 134, enters filter cartridges 136, 138 at the bottom thereof, and passes through electrodes 140, 142 and filter media 144, 146 where the particulate matter is charged in the same manner as described in the embodiment discussed above. The charged fluid exits cartridges 136, 138 through a series of spaced outlet openings 145, 147 formed around the periphery of cartridges 136, 138 adjacent the open tops thereof. To prevent the electrodes and filter media from obstructing the outlet openings a plurality of upper spacers 148, 150 made of rubber or the like, are interposed between the bottom surface of end caps 152, 154 and the upper electrodes 140a, 142a. The charged fluid exiting the cartridges passes between the outer cylindrical wall of cartridges 136, 138 and the interior cylindrical wall of housings 156, 158 and between the bases 160, 162 of the cartridges and the base plate 164. Lower spacers 166, 168 are positioned between the bases of the cartridges and the base plate to facilitate passage of the charged fluid from the housing area through outlets 170, 172. The positively charged fluid exiting housing 156 and the negatively charged fluid exiting housing 158 enter collecting cartridge 173 through inlet pipe 174. The agglomeration of the particulate matter and the trapping thereof by the filter media 176 takes place in cartridge 173 in the same manner as described in the embodiment discussed above. Cartridge 173 is constructed similar to cartridges 136, 138 and the decontaminated fluid flows out of cartridge 173 and exits the electrostatic filter 120 through outlet 180 in base plate in the same manner as discussed previously regarding the flow of the charged fluid from housing 156, 158.

What has been disclosed are embodiments of the invention which are very effective in terms of electrostatically filtering fluid borne particulates from a dielectric fluid, even from a fluid containing a high water content. The disclosed filters are easily assembled and tested at low cost and may be easily, quickly, and safely replaced.

While the above description provides a full and complete description of the preferred embodiments of the present invention, it is not restricted to those embodiments. It will be understood by those skilled in the art that various modifications, alternate constructions, and equivalents may be made therein without departing from the spirit and scope of the invention.

What is claimed is:

1. A filtering method for removing particles from fluids comprising the steps of:
   dividing the fluid to be filtered into two fluid streams and providing one of the fluid streams to an inlet of a first chamber and providing the other fluid stream to an inlet of a second chamber;
   providing a plurality of spaced electrode surfaces within each chamber with porous filter media interposed between the electrode surfaces;

connecting the electrode surfaces of the first chamber to a voltage of one polarity only and connecting the electrode surfaces of the second chamber to a voltage of opposite polarity only;

passing each fluid stream through the respective first and second chambers such that each fluid stream flows between the spaced electrode surfaces and in contact with the electrode surfaces so that the particles to be filtered come into close proximity to the electrode surfaces and pick up the charge of the electrode surfaces;

passing each fluid stream through an outlet of its respective chamber and providing both fluid streams to a third chamber which contains porous filter media;

joining the fluid streams together as they pass into and through the third chamber whereby the charged particles of opposite polarity are attracted to each other to form larger particles;

filtering the larger particles within the third chamber by capturing the larger particles within the filter media; and providing an outlet for the fluid from the third chamber.

2. The filtering method of claim 1, wherein each fluid stream that passes through the chambers containing the spaced electrode surfaces moves substantially transversely to the spaced electrode surfaces to assure sufficient contact between the fluid stream and the electrode surfaces so that the particles become charged.

* * * * *